United States Patent
Kuwano et al.

(10) Patent No.: US 12,522,086 B2
(45) Date of Patent: Jan. 13, 2026

(54) FUEL CELL VEHICLE

(71) Applicant: HONDA MOTOR CO., LTD., Tokyo (JP)

(72) Inventors: Yuki Kuwano, Tokyo (JP); Akihiro Matsui, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 250 days.

(21) Appl. No.: 18/127,906

(22) Filed: Mar. 29, 2023

(65) Prior Publication Data
US 2023/0311677 A1 Oct. 5, 2023

(30) Foreign Application Priority Data
Mar. 31, 2022 (JP) ................. 2022-058043

(51) Int. Cl.
*B60L 50/75* (2019.01)
*B60L 58/12* (2019.01)
*H01M 8/0432* (2016.01)

(52) U.S. Cl.
CPC ............. *B60L 50/75* (2019.02); *B60L 58/12* (2019.02); *H01M 8/0432* (2013.01)

(58) Field of Classification Search
CPC ..... Y02T 10/70; Y02T 90/40; Y02T 10/7072; Y02T 90/14; Y02T 10/72; Y02T 10/64; Y02T 90/12; Y02T 90/16; Y02T 10/62; H01M 8/0494; H01M 8/04559; H01M 8/0488; H01M 8/0432; B60L 50/75; B60L 58/12
USPC ....................................... 180/65.1
See application file for complete search history.

(56) References Cited

U.S. PATENT DOCUMENTS

| 10,056,626 | B2 * | 8/2018 | Kakeno | ............. B60L 58/12 |
| 2008/0238355 | A1 * | 10/2008 | Muramatsu | ....... H01M 8/04567 320/155 |
| 2013/0245871 | A1 * | 9/2013 | Shirasaka | ............ B60L 50/62 701/22 |
| 2017/0355279 | A1 * | 12/2017 | Matsumoto | ............ B60L 1/003 |

(Continued)

FOREIGN PATENT DOCUMENTS

| CN | 109962313 A | 7/2019 |
| CN | 111055698 A | 4/2020 |

(Continued)

OTHER PUBLICATIONS

Office Action / Search Report dated Nov. 28, 2025 issued in the corresponding Chinese Patent Application No. 202310323735.7 with the English machine translation thereof.

(Continued)

*Primary Examiner* — James A Shriver, II
*Assistant Examiner* — Hilary L Johns
(74) *Attorney, Agent, or Firm* — Carrier, Shende & Associates P.C.; Joseph P. Carrier; Jeffrey T. Gedeon

(57) ABSTRACT

A fuel cell vehicle includes each of an FC stack and a battery, as a power source for supplying electric power to a DU. The fuel cell vehicle also includes a temperature acquisition unit that acquire a temperature of a power source, an SOC acquisition unit that acquires an SOC of the battery, an electric power supply control unit that selects the power source which supplies the electric power to the DU when the fuel cell vehicle is activated, based on a temperature of the power source and the SOC of the battery.

6 Claims, 3 Drawing Sheets

(56) References Cited

U.S. PATENT DOCUMENTS

| | | | |
|---|---|---|---|
| 2018/0026283 A1* | 1/2018 | Furuyama | H01M 8/0494 |
| | | | 429/432 |
| 2020/0127310 A1* | 4/2020 | Watanabe | H01M 10/486 |
| 2020/0164769 A1* | 5/2020 | Hasegawa | B60L 15/2072 |
| 2020/0220184 A1 | 7/2020 | Shimada | |
| 2021/0098802 A1 | 4/2021 | Sakai et al. | |
| 2021/0188102 A1* | 6/2021 | Ichikawa | B60L 53/50 |
| 2021/0188129 A1* | 6/2021 | Ichikawa | B60L 58/30 |
| 2021/0194025 A1* | 6/2021 | Ichikawa | H01M 10/425 |

FOREIGN PATENT DOCUMENTS

| | | |
|---|---|---|
| CN | 111434518 A | 7/2020 |
| CN | 112582712 A | 3/2021 |
| JP | 2007-149450 A | 6/2007 |
| JP | 2013-208001 A | 10/2013 |
| JP | 2021-026867 A | 2/2021 |
| WO | 2019/026148 A1 | 2/2019 |

OTHER PUBLICATIONS

Office Action dated Sep. 9, 2025 issued in the corresponding Japanese Patent Application No. 2022-058043 with the English machine translation thereof.

\* cited by examiner

FUEL CELL VEHICLE

CROSS-REFERENCE TO RELATED APPLICATIONS

This application is based upon and claims the benefit of priority from Japanese Patent Application No. 2022-058043 filed on Mar. 31, 2022, the contents of which are incorporated herein by reference.

BACKGROUND OF THE INVENTION

Field of the Invention

The present invention relates to a fuel cell vehicle.

Description of the Related Art

In recent years, research and development have been conducted on fuel cells that contribute to energy efficiency in order to ensure that more people have access to affordable, reliable, sustainable and modern energy.

JP 2013-208001 A discloses a fuel cell vehicle driven by electric power of a fuel cell. In this fuel cell vehicle, a fuel cell stack is warmed up when the fuel cell vehicle is activated or started below the freezing temperature.

SUMMARY OF THE INVENTION

In the technique disclosed in JP 2013-208001 A, there is a problem that no consideration is given to switching between an EV start in which electric power is supplied from a battery to a drive unit and an HV start in which electric power is supplied from the battery and a fuel cell to the drive unit, when the fuel cell vehicle is started.

An object of the present invention is to solve the aforementioned problem.

According to an aspect of the present invention, there is provided a fuel cell vehicle including a power source configured to supply electric power to a drive unit, the power source including a fuel cell and a battery, a temperature acquisition unit configured to acquire a temperature of the power source, an SOC acquisition unit configured to acquire the state of charge (SOC) of the battery, an electric power supply control unit configured to select at least one of the fuel cell or the battery as the power source to supply the electric power to the drive unit when the fuel cell vehicle is activated, based on the acquired temperature of the power source and the SOC of the battery. If the battery is selected as the power source for supplying electric power to the drive unit, the fuel cell vehicle can start to travel without waiting for the completion of activation of the fuel cell. When both the fuel cell and the battery are selected as the power sources for supplying power to the drive unit, the demanded electric power of the drive unit can be satisfied at the time of low temperature.

According to the present invention, the EV start and the HV start can be switched in accordance with the temperature of the power supply.

The above and other objects, features, and advantages of the present invention will become more apparent from the following description when taken in conjunction with the accompanying drawings, in which a preferred embodiment of the present invention is shown by way of illustrative example.

DETAILED DESCRIPTION OF THE INVENTION

First Embodiment

[Configuration of Fuel Cell Vehicle]

Figure 1:
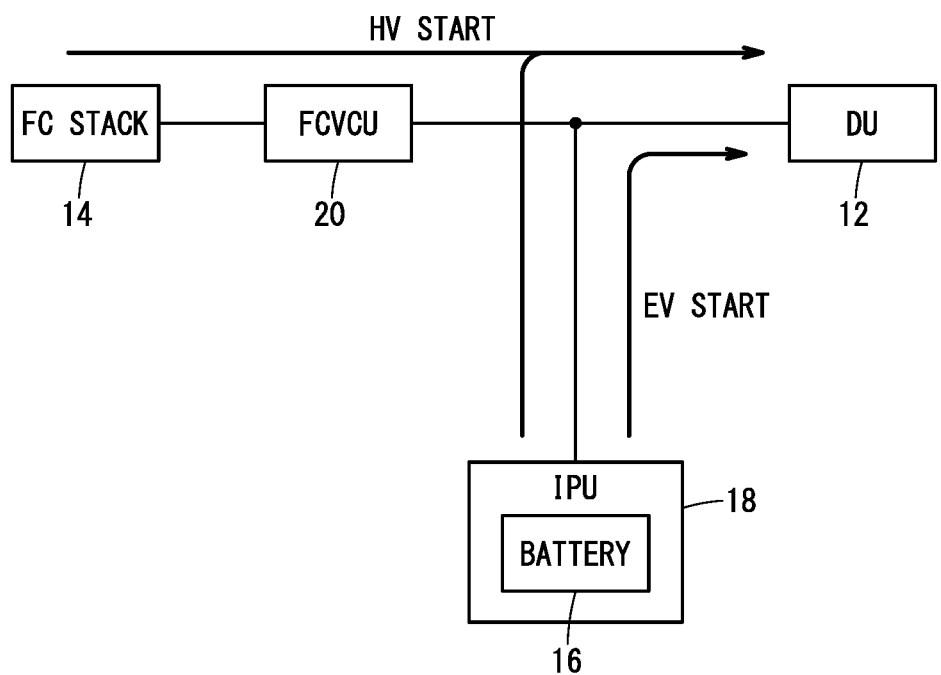
FIG. 1 is a system diagram of a fuel cell vehicle.

FIG. 1 is a system diagram of a fuel cell vehicle 10 according to the present embodiment. The fuel cell vehicle 10 uses electric power to operate a drive unit 12 (hereinafter referred to as "DU12") that drives drive wheels. The fuel cell vehicle 10 includes each of a fuel cell stack 14 (hereinafter, referred to as an FC stack 14) and a battery 16, as a power source of the DU12. The FC stack 14 corresponds to the fuel cell of the present invention.

An intelligent power unit 18 (hereinafter referred to as "IPU 18") includes a DC-DC converter, an electronic control unit (ECU) for battery control, and the like in addition to the battery 16. The battery 16 is, for example, a lithium ion battery.

The electric power generated by the FC stack 14 is boosted by a fuel cell boost converter 20 (hereinafter referred to as an FCVCU 20) and supplied to the DU12. The electric power stored in the battery 16 is supplied to the DU12.

The fuel cell vehicle 10 switches between an EV start and an HV start in accordance with conditions when the fuel cell vehicle 10 is started. In the EV start, a DU control unit 36 operates the DU12 using only the electric power supplied from the battery 16. In the HV start, the DU control unit 36 operates the DU12 by using the electric power supplied from both the FC stack 14 and the battery 16.

Figure 2:
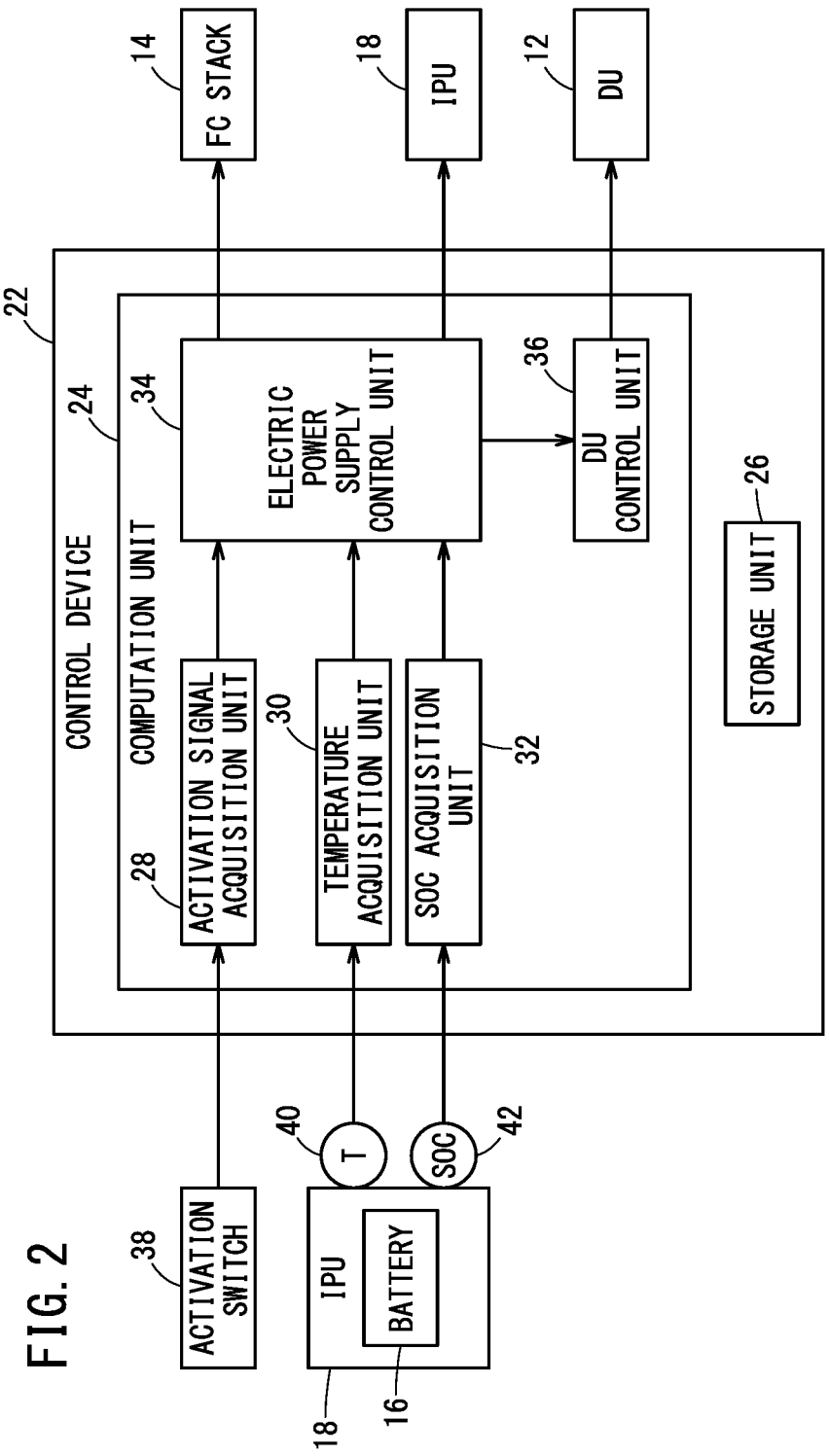
FIG. 2 is a block diagram illustrating the configuration of a control device.

FIG. 2 is a block diagram illustrating the configuration of a control device 22. The control device 22 controls the DU12 and the FC stack 14.

The control device 22 includes a computation unit 24 and a storage unit 26. The computation unit 24 is, for example, a processor such as a central processing unit (CPU) or a graphics processing unit (GPU). The computation unit 24 includes an activation signal acquisition unit 28, a temperature acquisition unit 30, an SOC acquisition unit 32, an electric power supply control unit 34, and the DU control unit 36. The activation signal acquisition unit 28, the temperature acquisition unit 30, the SOC acquisition unit 32, the electric power supply control unit 34, and the DU control unit 36 are realized by the computation unit 24 executing programs which are stored in the storage unit 26. It should be noted that at least a part of the activation signal acquisition unit 28, the temperature acquisition unit 30, the SOC acquisition unit 32, the electric power supply control unit 34, and the DU control unit 36 may be realized by an integrated circuit such as an application specific integrated circuit (ASIC) or a field-programmable gate array (FPGA). It should be noted that at least a part of the activation signal acquisition unit 28, the temperature acquisition unit 30, the SOC acquisition unit 32, the electric power supply control unit 34, and the DU control unit 36 may be realized by an electronic circuit including a discrete device.

The storage unit 26 is made up of a volatile memory (not illustrated) and a nonvolatile memory (not illustrated), each of which is a computer readable storage medium. The volatile memory is, for example, a random access memory (RAM) or the like. The nonvolatile memory is, for example, a read only memory (ROM), a flash memory, or the like. Data, etc. may be stored, for example, in the volatile memory. Programs, tables, maps, and the like are stored, for example, in the nonvolatile memory. At least a portion of the storage unit 26 may be provided in the processor, the integrated circuit, or the like, which were described above.

The activation signal acquisition unit 28 acquires an activation signal indicating that an activation switch (or starting switch) 38 is turned on. The activation switch 38 is operated by a driver or the like who drives the fuel cell vehicle 10. When the activation switch 38 is turned on, the fuel cell vehicle 10 is activated.

The temperature acquisition unit 30 acquires a temperature of the IPU 18 from a temperature sensor 40 that detect the temperature of the IPU 18. The temperature sensor 40 detects a temperature around or inside the battery 16. Even if a state of charge (SOC) of the battery 16 is constant, the magnitude of electric power that can be output from the battery 16 changes according to temperature. The temperature sensor 40 may acquire a temperature at any position as long as the temperature is correlated with a change in the magnitude of electric power that can be output by the battery 16.

The SOC acquisition unit 32 acquires the SOC of the battery 16 from an SOC sensor 42 that detects the SOC of the battery 16.

The electric power supply control unit 34 controls the FC stack 14 and the IPU 18 based on the presence or absence of the activation signal, the temperature of the IPU 18, the SOC of the battery 16, and the like. When the activation signal acquisition unit 28 acquires the activation signal, the electric power supply control unit 34 prepares to supply power from the FC stack 14 and the IPU 18 to the DU12. When the preparation is completed, the electric power supply control unit 34 outputs a travel permission signal to the DU control unit 36.

When receiving the travel permission signal from the electric power supply control unit 34, the DU control unit 36 controls the DU12 to cause the fuel cell vehicle 10 to travel.

[Selection of Power Supply Method at Time of Activation]

When the activation signal acquisition unit 28 acquires the activation signal, the electric power supply control unit 34 prepares to supply power from the FC stack 14 and the IPU 18 to the DU12. When the preparation is completed, the electric power supply control unit 34 outputs a travel permission signal to the DU12.

Figure 3:
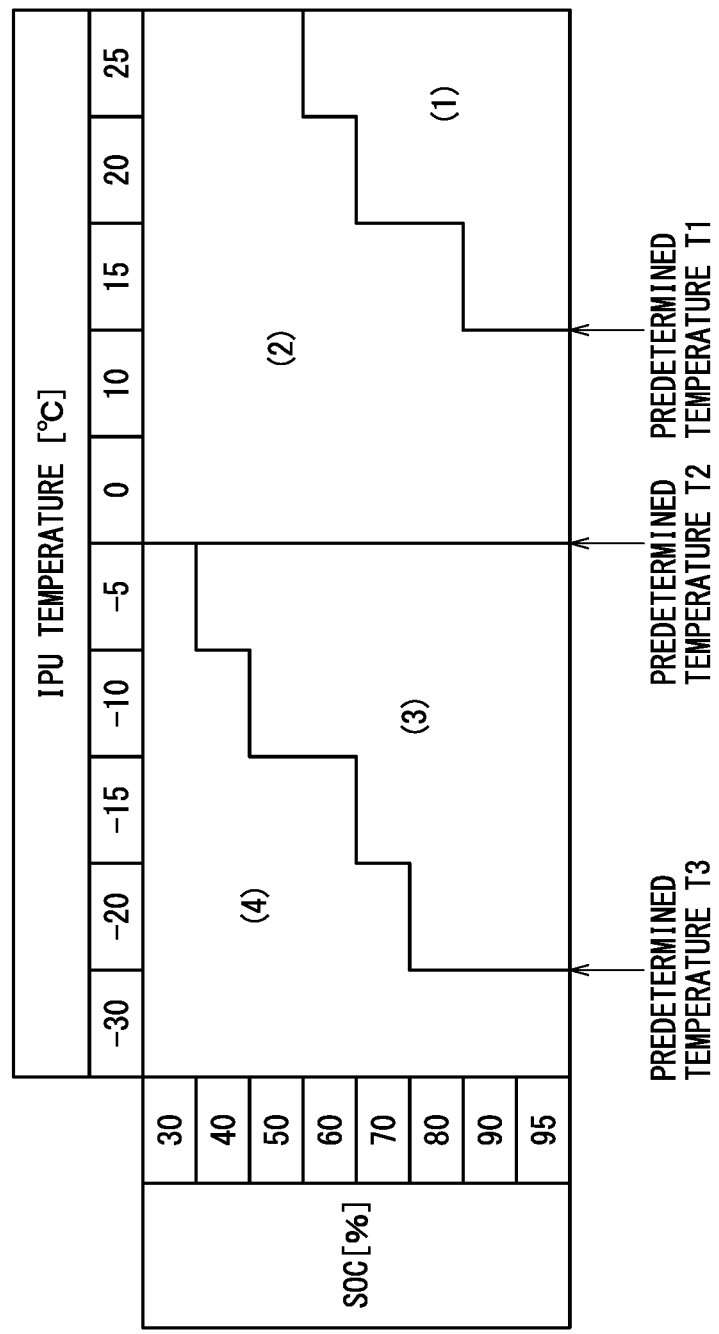
FIG. 3 is a map of conditions under which an electric power supply control unit outputs a travel permission.

FIG. 3 is a map of conditions under which the electric power supply control unit 34 outputs a travel permission. One of the following conditions (1) to (4) is selected in accordance with the temperature of the IPU 18 and the SOC of the battery 16. The selected one condition is set to a condition under which the electric power supply control unit 34 outputs the travel permission.

Condition (1): After completion of preparation of the high voltage device
Condition (2): After completion of activation of the FC stack 14
Condition (3): After completion of activation of the FC stack 14 after warming up of the FC stack 14
Condition (4): After completion of activation of the FC stack 14 after warming up of the FC stack 14 and heating of the battery 16

If the above condition (1) is selected, the EV start is performed. If any of the above conditions (2) to (4) is selected, the HV start is performed.

The completion of preparation of the high-voltage device indicates, for example, that the precharge of the capacitor in the DC-DC converter in the IPU 18 has been completed.

The completion of activation of the FC stack 14 indicates, for example, that the temperature of generated water, gas, or the like discharged from the FC stack 14 has reached a predetermined temperature (for example, 70° C.) or higher. Alternatively, the completion of activation of the FC stack 14 indicates that the electric power output from the FC stack 14 has been stabilized.

The warming up of the FC stack 14 indicates that the FC stack 14 is caused to generate power at a low voltage to increase power generation loss of the FC stack 14, so as to generate heat by itself.

The heating of the battery 16 indicates that hot water heated by a heater (not shown) is supplied to the periphery of the battery 16. The heater is operated by the electric power of the battery 16 or the electric power generated when the FC stack 14 is warmed up. The battery 16 may be heated by supplying the air heated by the heater to the periphery of the battery 16.

If the temperature of the IPU 18 is equal to or higher than a predetermined temperature T1, the electric power supply control unit 34 selects the condition (1). If the condition (1) is satisfied, the electric power supply control unit 34 outputs a travel permission signal to the DU control unit 36. In this case, the electric power supply control unit 34 completes the activation of the FC stack 14 while the DU12 is operated by the electric power of the battery 16. As a result, the fuel cell vehicle 10 can start to travel without waiting for completion of activation of the FC stack 14. The predetermined temperature T1 is set to a lower temperature as the SOC of the battery 16 increases. The predetermined temperature T1 corresponds to a first predetermined temperature of the present invention.

If the temperature of the IPU 18 is lower than the predetermined temperature T1 and equal to or higher than a predetermined temperature T2, the electric power supply control unit 34 selects the condition (2). If the condition (2) is satisfied, the electric power supply control unit 34 outputs a travel permission signal to the DU control unit 36. If the temperature of the IPU 18 is lower than the predetermined temperature T1, the electric power of the battery 16 may be insufficient for the demanded electric power from the DU12 at the start of traveling of the fuel cell vehicle 10. The electric power supply control unit 34 supplies electric power from the FC stack 14 in addition to the electric power of the battery 16, thereby ensuring the demanded electric power of the DU12. The predetermined temperature T2 is set to, for example, 0° C. The predetermined temperature T2 corresponds to a second predetermined temperature of the present invention.

If the temperature of the IPU 18 is lower than the predetermined temperature T2 and equal to or higher than a predetermined temperature T3, the electric power supply control unit 34 selects the condition (3). If the condition (3) is satisfied, the electric power supply control unit 34 outputs a travel permission signal to the DU control unit 36. If the temperature of the IPU 18 is lower than the predetermined temperature T2, the water generated in each cell of the FC stack 14 may freeze. The electric power supply control unit 34 causes the FC stack 14 to warm up so as to thaw the FC stack 14. The predetermined temperature T3 is lower than the predetermined temperature T2, and is set to a lower temperature as the SOC of the battery 16 increases. The predetermined temperature T3 corresponds to a third predetermined temperature of the present invention.

If the temperature of the IPU 18 is lower than the predetermined temperature T3, the electric power supply control unit 34 selects the condition (4). If the condition (4) is satisfied, the electric power supply control unit 34 outputs a travel permission signal to the DU control unit 36. If the temperature of the IPU 18 is lower than the predetermined temperature T3, the electric power that can be output by the battery 16 is considerably low. By heating the battery 16, the electric power supply control unit 34 can supply a relatively large amount of electric power from the battery 16 to the DU12 when the fuel cell vehicle 10 is started as the HV start.

[Operation and Advantageous Effects]

In the fuel cell vehicle 10 according to the present embodiment, the electric power supply control unit 34 selects a power source that supplies power to the DU12 based on the temperature of the IPU 18 and the SOC of the battery 16 when the fuel cell vehicle 10 is activated.

Since the EV start for operating the DU12 using only the electric power of the battery 16 is performed when the fuel cell vehicle 10 is activated, the fuel cell vehicle 10 can start to travel without waiting for the completion of the activation of the FC stack 14. However, if the temperature of the IPU 18 is low, there is a problem that the demanded electric power of the DU12 cannot be satisfied only with the power of the battery 16. In this case, the HV start for operating the DU12 by using the electric power of both the FC stack 14 and the battery 16 is performed. As a result, electric power is supplied to the DU12 from both the FC stack 14 and the battery 16, whereby the fuel cell vehicle 10 can satisfy the demanded electric power of the DU12. This in turn contributes to energy efficiency.

If the temperature of the IPU 18 is equal to or higher than the predetermined temperature T1, the electric power supply control unit 34 supplies power from the battery 16 to the DU12 when the fuel cell vehicle 10 is activated. As a result, the fuel cell vehicle 10 can start to travel early.

If the temperature of the IPU 18 is lower than the predetermined temperature T1, the electric power supply control unit 34 supplies electric power to the DU12 from both the FC stack 14 and the battery 16 after the FC stack 14 has been activated when the fuel cell vehicle 10 is activated. Thus, the electric power supplied from both the FC stack 14 and the battery 16 to the DU12 can satisfy the demanded electric power of the DU12.

If the temperature of the IPU 18 is lower than the predetermined temperature T2, the electric power supply control unit 34 warms up the FC stack 14 when fuel cell vehicle 10 is activated. After the activation of the FC stack 14 is completed, the electric power supply control unit 34 supplies electric power to the DU12 from both the FC stack 14 and the battery 16. Thus, the FC stack 14 can stably generate electric power.

If the temperature of the IPU 18 is lower than the predetermined temperature T3, the electric power supply control unit 34 warms up the FC stack 14 and heats the battery 16 when fuel cell vehicle 10 is activated. After the activation of the FC stack 14 is completed, the electric power supply control unit 34 supplies electric power to the DU12 from both the FC stack 14 and the battery 16. Thus, relatively large electric power can be supplied from the battery 16 to the DU12.

It should be noted that the present invention is not limited to the embodiment described above, and various configurations can be adopted therein without departing from the essence and gist of the present invention.

In the first embodiment, the electric power supply control unit 34 selects one of the above conditions (1) to (4) based on the temperature of the IPU 18. On the other hand, the electric power supply control unit 34 may select one of the above conditions (1) to (4) based on the temperature of the FC stack 14. If the time from when the activation switch 38 is turned off and the fuel cell vehicle 10 is stopped to when the activation switch 38 is turned on and the fuel cell vehicle 10 is activated, is sufficiently long, the temperatures of the IPU 18 and the FC stack 14 become substantially equal to the outside air temperature. Therefore, the electric power supply control unit 34 may select one of the above conditions (1) to (4) based on the outside air temperature.

[Invention Obtained from Embodiment]

The invention that can be grasped from the above-described embodiment will be described below.

The fuel cell vehicle (10) includes a power source that supplies electric power to the drive unit (12), the power source including the fuel cell (14) and the battery (16), the temperature acquisition unit (30) that acquires a temperature of the power source, the SOC acquisition unit (32) that acquires the state of charge (SOC) of the battery, the electric power supply control unit (34) that selects at least one of the fuel cell or the battery as the power source to supply the electric power to the drive unit when the fuel cell vehicle is activated, based on the acquired temperature of the power source and the SOC of the battery. If the battery is selected as the power source for supplying electric power to the drive unit, the fuel cell vehicle can start to travel without waiting for the completion of activation of the fuel cell. When both the fuel cell and the battery are selected as the power sources for supplying power to the drive unit, the demanded electric power of the drive unit can be satisfied at the time of low temperature.

In the above-described fuel cell vehicle, if the acquired temperature of the power source is equal to or higher than the first predetermined temperature (T1) set in accordance with the SOC of the battery, when the fuel cell vehicle is activated, the electric power supply control unit may supply the electric power from the battery to the drive unit. Thus, the fuel cell vehicle can start to travel early.

In the above-described fuel cell vehicle, if the acquired temperature of the power source is lower than the first predetermined temperature set in accordance with the SOC of the battery, when the fuel cell vehicle is activated, the electric power supply control unit may supply the electric power from the fuel cell and the battery to the drive unit. Thus, the electric power supplied from the fuel cell and the battery to the drive unit can satisfy the demanded electric power of the drive unit.

In the above-described fuel cell vehicle, if the acquired temperature of the power source is lower than the first predetermined temperature, when the fuel cell vehicle is activated, the electric power supply control unit may supply the electric power from the fuel cell and the battery to the drive unit after activation of the fuel cell is completed. Thus, the electric power supplied from the fuel cell and the battery to the drive unit can satisfy the demanded electric power of the drive unit.

In the above-described fuel cell vehicle, if the acquired temperature of the power source is lower than the second predetermined temperature (T2), when the fuel cell vehicle is activated, the electric power supply control unit may warm up the fuel cell, and supply the electric power from the fuel cell and the battery to the drive unit after the activation of the fuel cell is completed, and the second predetermined temperature may be set to a temperature lower than the first predetermined temperature. Thus, the fuel cell can stably generate electric power.

In the above-described fuel cell vehicle, if the acquired temperature of the power source is lower than the third predetermined temperature (T3) set in accordance with the SOC of the battery, when the fuel cell vehicle is activated, the electric power supply control unit may warm up the fuel cell and heat the battery, and supply the electric power from the fuel cell and the battery to the drive unit after the activation of the fuel cell is completed, and the third predetermined temperature may be set to a temperature lower than the second predetermined temperature. Thus, relatively large electric power can be supplied from the battery to the drive unit.

The present invention is not limited to the above disclosure, and various modifications are possible without departing from the essence and gist of the present invention.

The invention claimed is:

1. A fuel cell vehicle comprising:
    a power source configured to supply electric power to a drive unit, the power source including a fuel cell and a battery; and
    one or more processors that execute computer-executable instructions stored in a memory,
    wherein the one or more processors execute the computer-executable instructions to cause the fuel cell vehicle to:
    acquire a temperature of the power source;
    acquire a state of charge of the battery;
    select at least one of the fuel cell or the battery as the power source to supply the electric power to the drive unit when the fuel cell vehicle is activated, based on the acquired temperature of the power source and the state of charge of the battery.

2. The fuel cell vehicle according to claim 1, wherein if the acquired temperature of the power source is equal to or higher than a first predetermined temperature set in accordance with the state of charge of the battery, when the fuel cell vehicle is activated, the fuel cell vehicle supplies the electric power from the battery to the drive unit.

3. The fuel cell vehicle according to claim 1, wherein if the acquired temperature of the power source is lower than a first predetermined temperature set in accordance with the state of charge of the battery, when the fuel cell vehicle is activated, the fuel cell vehicle supplies the electric power from the fuel cell and the battery to the drive unit.

4. The fuel cell vehicle according to claim 2, wherein if the acquired temperature of the power source is lower than the first predetermined temperature, when the fuel cell vehicle is activated, the electric power is supplied from the fuel cell and the battery to the drive unit after activation of the fuel cell is completed.

5. The fuel cell vehicle according to claim 4, wherein if the acquired temperature of the power source is lower than a second predetermined temperature, when the fuel cell vehicle is activated, the fuel cell is warmed up, and the electric power is supplied from the fuel cell and the battery to the drive unit after the activation of the fuel cell is completed, and
    the second predetermined temperature is set to a temperature lower than the first predetermined temperature.

6. The fuel cell vehicle according to claim 5, wherein if the acquired temperature of the power source is lower than a third predetermined temperature set in accordance with the state of charge of the battery, when the fuel cell vehicle is activated, the fuel cell is warmed up and the battery is heated, and the electric power is supplied from the fuel cell and the battery to the drive unit after the activation of the fuel cell is completed, and
    the third predetermined temperature is set to a temperature lower than the second predetermined temperature.

* * * * *